| United States Patent [19] | | [11] Patent Number: 4,857,585 |
|---|---|---|
| Leising | | [45] Date of Patent: Aug. 15, 1989 |

[54] STABLE AMPHOTERIC AQUEOUS DISPERSIONS OF SYNTHETIC POLYMERS

[75] Inventor: Frederic Leising, Vaujours, France

[73] Assignee: Rhone-Poulenc Specialities Chimiques, Courbevoie, France

[21] Appl. No.: 573,728

[22] Filed: Jan. 25, 1984

[30] Foreign Application Priority Data

Jan. 28, 1983 [FR] France ............................. 83 01300

[51] Int. Cl.$^4$ ................................................ C08L 0/00
[52] U.S. Cl. ................................. 524/815; 524/812; 524/814
[58] Field of Search ................. 524/875, 814, 812

[56] References Cited

U.S. PATENT DOCUMENTS

| 2,512,697 | 3/1944 | Grotenhuis | 524/457 |
|---|---|---|---|
| 2,746,943 | 5/1956 | Pritchard | 524/457 |
| 2,808,388 | 10/1957 | Hellman | 524/457 |
| 2,870,118 | 1/1959 | Bader et al. | 525/255 |
| 2,965,594 | 12/1960 | Maeder | 524/815 |
| 3,108,979 | 10/1963 | Le Fevre et al. | 524/814 |
| 3,253,941 | 4/1963 | Finn et al. | 427/155 |
| 3,321,431 | 5/1967 | McNab et al. | 524/829 |
| 3,399,159 | 8/1968 | Samour | 524/808 |
| 3,404,114 | 10/1968 | Snyder et al. | 524/812 |
| 3,594,453 | 7/1971 | Cusano | 525/259 |
| 3,635,867 | 1/1972 | Yuille | 524/457 |
| 3,637,565 | 1/1972 | Sheetz | 260/29.6 TA |
| 3,808,158 | 4/1974 | Bollo | 526/216 |
| 4,017,440 | 4/1977 | Killam | 524/815 |
| 4,051,093 | 9/1977 | Wendel et al. | 524/815 |
| 4,064,091 | 12/1977 | Samour et al. | 524/814 |
| 4,111,922 | 9/1978 | Beede et al. | 524/815 |
| 4,154,910 | 5/1979 | Tanaka et al. | 524/829 |
| 4,166,882 | 9/1979 | Das et al. | 524/829 |
| 4,304,703 | 12/1981 | Das | 525/279 |
| 4,314,044 | 2/1982 | Hughes et al. | 524/829 |
| 4,337,185 | 6/1982 | Wessling et al. | 524/815 |
| 4,349,641 | 9/1982 | Maslanka et al. | 525/279 |
| 4,373,056 | 2/1983 | Besecke et al. | 524/814 |
| 4,403,065 | 9/1983 | Yoshioka et al. | 524/812 |
| 4,426,489 | 1/1984 | Wessling et al. | 524/815 |

*Primary Examiner*—Joseph L. Schofer
*Assistant Examiner*—Alex H. Walker
*Attorney, Agent, or Firm*—Finnegan, Henderson, Farabow, Garrett, & Dunner

[57] ABSTRACT

Stable amphoteric aqueous dispersions of synthetic polymers obtained by reacting at least one unsaturated nitrogen compound capable of being hydrolyzed in an acid or alkaline medium with an aqueous emulsion reaction mixture, containing cationic species, of at least one non-ionic monomer capable of being copolymerized with the nitrogen compound to form synthetic polymers and at least one substance which generates cationic species capable of chemically binding with the synthetic polymers.

21 Claims, No Drawings

STABLE AMPHOTERIC AQUEOUS DISPERSIONS OF SYNTHETIC POLYMERS

FIELD OF THE INVENTION

This invention relates to stable amphoteric aqueous dispersions of synthetic polymers obtained by reacting at least one unsaturated nitrogen compound capable of being hydrolyzed in an acid or alkaline medium with an aqueous emulsion reaction mixture. A process for making the aqueous dispersions of the claimed invention and a composition capable of forming the aqueous dispersions are also disclosed.

BACKGROUND OF THE INVENTION

It is known in the art that amphoteric latices can be prepared by aqueous emulsion polymerization. U.S. Pat. No. 3,404,114 discloses the preparation of amphoteric latices by (1) heating an aqueous system with polymerization catalyst and an emulsifier; (2) adding to the aqueous system an unsaturated carboxylic acid monomer and an unsaturated acid ester monomer; (3) neutralizing the mixture to a pH of about 7 with a neutralizing agent containing nitrogen; and (4) adding to the aqueous system an alkyl amino alkyl ester of an unsaturated acid monomer from the mixture.

Though this process produces stable latices, an appreciable percentage of undesirable grains accumulate during the polymerization or neutralization of the aqueous dispersion due to the instability of the polymer particles. These grains cause low filtration yields which lead to increased production costs, and the grains also decrease the quality of the dispersions.

The present invention addresses these difficulties by eliminating the intermediate neutralization stage, thereby producing stable amphoteric aqueous dispersions of synthetic polymers with less than 500 parts per million of undesirable grains, (about 0.05 percent of undesirable grains by weight of polymer). As used herein, the term undesirable grains refers to the total amount of grains which are retained after sifting the grains through a mesh screen of 40$\mu$ wide and a mesh screen 100$\mu$ wide.

SUMMARY OF THE INVENTION

The present invention provides a process for making stable amphoteric aqueous dispersions of synthetic polymers comprising the steps of providing at least one unsaturated nitrogen compound capable of being hydrolyzed in an acid or alkaline medium and reacting the nitrogen compound with an aqueous emulsion reaction mixture containing cationic species, of at least one non-ionic monomer, capable of being copolymerized with the hydrolyzable unsaturated nitrogen compound to form synthetic polymers, and at least one substance which generates cationic species capable of chemically binding with the synthetic polymers.

The invention also includes both the stable amphoteric aqueous dispersions of synthetic polymers obtained by reacting an unsaturated nitrogen compound with an aqueous emulsion reaction mixture containing cationic species, and a composition capable of forming stable amphoteric aqueous dispersions comprising an unsaturated nitrogen compound and an aqueous emulsion reaction mixture.

DETAILED DESCRIPTION OF THE INVENTION

In accordance with the invention as embodied herein, the stable amphoteric aqueous dispersions of synthetic polymers can be made by providing at least one unsaturated nitrogen compound capable of generating anionic charges by partial or total hydrolysis in a basic medium, and reacting the nitrogen compound with an aqueous emulsion reaction mixture, containing cationic species. The aqueous emulsion reaction mixture contains at least one non-ionic monomer capable of being copolymerized with the nitrogen compound and at least one substance which generates cationic species. The substance is selected from the group consisting of a polymerization initiator which generates radicals with cationic extremities, an unsaturated salt of a polycoordinated onium of a group 5a or 6a element capable of copolymerizing with the monomer, and mixtures thereof. The amount of the substance which generates cationic species corresponds to a ratio of the number of cationic charges generated by said substance to the number of anionic charges generated by said nitrogen compound in a basic medium, of less than 1.

The invention also includes stable amphoteric aqueous dispersions of synthetic polymers obtained by reacting at least one unsaturated nitrogen compound capable of being hydrolyzed in an acid or alkaline medium, with an aqueous emulsion reaction mixture, containing cationic species, of at least one non-ionic monomer capable of being copolymerized with the nitrogen compound to form synthetic polymers and at least one substance which generates cationic species capable of chemically binding with the synthetic polymers.

The invention further embodies a composition capable of forming stable amphoteric aqueous dispersions of synthetic polymers comprising at least one unsaturated nitrogen compound capable of being hydrolyzed in an acid or alkaline medium and an aqueous emulsion reaction mixture, containing cationic species, of at least one non-ionic monomer capable of being copolymerized with the nitrogen compound to form synthetic polymers and at least one substance which generates cationic species capable of chemically binding with the synthetic polymers.

The unsaturated nitrogen compound is considered partially hydrolyzable if it has at least about a 10% hydrolysis level when polymerized in an acid or alkaline medium. For example, those compounds which correspond to the following general formula may be used in preparing the aqueous dispersions of the present invention:

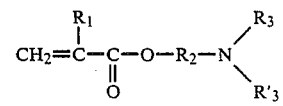

where, $R_1$ is a hydrogen atom or a methyl group, $R_2$ is a methylene or an ethylene group, $R_3$ is a hydrogen atom or a linear alkyl group with 1 to 4 carbon atoms, and $R'_3$ is either a hydrogen atom or a linear alkyl group with 1 to 4 carbon atoms or, if $R_3$ is a hydrogen atom, a branched alkyl group with 3 or 4 carbon atoms, with the total number of carbon atoms in groups $R_2$, $R_3$, and $R'_3$ being less than or equal to 8, preferably less than equal to 6.

Examples of such compounds are dimethylaminomethyl acrylate or methacrylate, dimethyulaminoethyl acrylate or methacrylate, tert-butylaminomethyl acrylate or methacrylate, and tert-butylaminoethyl acrylate or methacrylate.

Typical non-ionic monomers which may be employed in the process of the present invention include vinylaromatic compounds, such as styrene, α-methylstyrene, vinyltoluene and monochlorostyrene, vinyl esters, such as vinyl acetate, vinyl propionate, vinyl versatate and vinyl butyrate, ethylenic nitriles, such as acrylonitrile and methacrylonitrile, ethylenic carboxylic esters, such as methyl, ethyl, propyl, isopropyl, butyl, 2-ethylhexyl, hydroxyethyl, hydroxypropyl or glycidyl acrylate, methyl, ethyl, propyl, butyl, hydroxyethyl, hydroxypropyl, or glycidyl methacrylate, dialkyl esters of ethylenic dicarboxylic acids, such as dialkyl esters of fumaric acid, maleic acid and itaconic acid, and ethylenic amides and the N-substituted derivatives of ethylenic amides such as acrylamide, methacrylamide, and N-methylol and N-methoxy-methyl-acrylamide and -methacrylamide. These non-ionic monomers may be used individually or, if they are capable of being copolymerized with one another, as a mixture of 2 or more.

The substance which generates cationic species must be either non-hydrolyzable or partially hydrolyzable. In other words, the substance must have a hydrolysis level of less than or equal to 50%. For example, polymerization initiators which produce radicals with cationic extremities, such as 2,2'-azobis-(2-amidinopropane) hydrochloride and azo-bis-N,N'-dimethyleneisobutyramidine hydrochloride, unsaturated salts of a polycoordinated onium of a group 5a or 6a element (nitrogen, phosphorous or sulfur) capable of being copolymerized with the non-ionic monomer, and mixtures thereof may be used as the substance which generate cationic species. As used in this specification and the claims, any salt containing an onium cation, with all of the group 5a or 6a element valences satisfied by hydrocarbon groupings, at least one of which hydrocarbon groupings is unsaturated, and the free valency of the group 5a or 6a element is saturated by a carbon atom is considered an unsaturated salt of a polycoordinated onium of a group 5a or 6a element.

Exemplary of such unsaturated salts are the unsaturated quaternary ammonium salts having the formula:

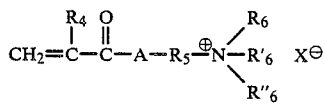

where X− is Cl−, Br−, I−, SO$_4$H−, SO$_4$−−, CH$_3$SO$_4$−, C$_2$H$_5$SO$_4$−, or CH$_3$COO−, R$_4$ is a hydrogen atom or a methyl group, A is an oxygen atom or an —NH— group, R$_5$ is a linear or branched alkylene group with 1 to 18 carbon atoms, preferably 1 to 10 carbon atoms, and R$_6$, R'$_6$, and R"$_6$, which may be identical or different, are either an alkyl group with 1 to 4 carbon atoms, optionally substituted by a hydroxyl radical, or a phenyl group, optionally substituted by an alkyl radical with 1 to 9 carbon atoms, wherein the total number of carbon atoms in groups R$_5$, R$_6$, R'$_6$, and R"$_6$ is greater than 4 if A is oxygen.

Examples of such quaternary ammonium salts include the chloride of trimethylaminoethyl-acrylamide or -methacrylamide, the bromide of trimethylaminopropyl-acrylamide or -methacrylamide, the methysulfate of trimethyl-aminobutyl-acrylamide or -methacrylamide, and the chloride of trimethylaminopropyl methacrylate.

In addition to quaternary ammonium salts, unsaturated pyridinium, quinolinium, imidazolium and benzimidazolium salts may be used as the substance which generates cationic species. Examples of such onium salts include 1-methyl-2-vinylpyridinium bromide, 1-ethyl-2-vinyl-pyridinium chloride, 1-ethyl-2-vinylpyridinium methylsulfate, 1-benzyl-4-vinylpyridinium chloride, 1-methyl-2-vinyl-quinolinium iodide, N-vinyl-N'-methylimidazolium bromide and 1-vinyl-3-methylbenzimidazolium bromide, (2-methacryloxy)-dimethylsulfonium chloride, methyldiallyl-sulfonium methylsulfate and trimethylvinylphosphonium bromide.

The unsaturated nitrogen compound can be added to the reaction mixture during any stage of the polymerization of the non-ionic monomer. For example, the nitrogen compound can be added to the reaction mixture at the start of the polymerization process, continuously or discontinuously throughout the polymerization process, after at least about 30% of the non-ionic monomer has been converted to the synthetic polymer, or after polymerization is complete, when about 90 to 98% of the non-ionic monomer has been converted to the polymer. Thus, the reaction mixture can include both non-ionic monomers and polymerized non-ionic monomers.

The substance which generates cationic species can be added to the reaction mixture before or simultaneously with the unsaturated nitrogen compound. In addition, the substance can be present in the reaction mixture, in the form of a cationic seed, at the start of the polymerization of the non-ionic monomer. The cationic seed is a polymer or copolymer previously prepared by aqueous emulsion polymerization, in a cationic medium, of the non-ionic monomer(s) in the presence of the desired amount of the substance which generates cationic charges.

The amount of unsaturated nitrogen compound required is about 1 to 20%, preferably about 1 to 10% by weight of non-ionic monomer(s), expressed by weight of solids.

The amount of substance which generates cationic species used in the claimed process depends on the hydrolysis level of both the unsaturated nitrogen compound and the substance which generates cationic species, and is determined by the molar ratio of the number of moles of the said substance initially in the reaction mixture plus the number of moles of the nitrogen compound to the number of moles of the non-ionic monomer initially in the reaction mixture. This ratio is generally between about 0.1 and 15. For example, for a 90% hydrolysis level for the unsaturated nitrogen compound and a 0% hydrolysis level for the substance which generates cationic species, the preferred molar ratio is between about 1 to 15, preferably between about 1 and 10. For a 10% hydrolysis level for the unsaturated nitrogen compound and a 0% hydrolysis level for the substance which generates cationic species, the molar ratio is preferably between about 0.1 and 1.5, most preferably between about 0.2 and 1. While for a 90% hydrolysis level for the unsaturated nitrogen compound and a 25% hydrolysis level for the substance which generates cationic species, the molar ratio is preferably between about 0.5 and 10, most preferably between about 1 and 5.

The copolymerization of the nitrogen compound with the non-ionic monomer is carried out under conventional aqueous emulsion polymerization conditions, at a temperature between about 60° C. and 90° C., preferably between about 75° C. and 85° C., and at any pH, from about 3 to about 12, most preferably from 5 to 9, in the presence of either a cationic or non-ionic initiator or emulsifying agent and, as aforementioned, in the presence of the substance which generates cationic charges.

Those substances which generate cationic species may also be used as cationic initiators.

Typical non-ionic initiators include (1) mineral or organic peroxides and hydroperoxides which are soluble in either water or organic solvents and which generate non-charged free radicals, such as hydrogen peroxide, benzoyl peroxide, tert-butyl hydroperoxide, cumene hydroperoxide, tert-butyl perbenzoate, diisopropylbenzene peroxide, and methyl ethyl ketone peroxide, (2) redox systems obtained by combining the above peroxides or hydroperoxides with a reducing agent, such as ascorbic acid, sugars, polyvalent metal salts, sulfites, bisulfites, sulfoxalates, thiosulfates and bisulfites of sodium or calcium,, and the formaldehydesulfoxylate of sodium or zinc, and (3) azoaliphatic compounds having an azocyclic group and an aliphatic carbon atom on each nitrogen atom, with at least one of the carbon atoms being tertiary, such as azobisisobutyronitrile, 2,2'-azo-bis(2,4-dimethylvaleronitrile), 2,2'-azo-bis(2,4,4-trimethylvaleronitrile) and 2,2'-azo-bis(2,4-dimethyl-4-methoxyvaleronitrile).

Exemplary non-ionic emulsifiers include polyethoxylated fatty alcohols, polyethoxylated alkylphenols, and polyethoxylated fatty acids.

Examples of cationic emulsifiers include decylammonium methylsulfate, N-ethyldodecylammonium bromide, cetylammonium chloride, cetylammonium bromide, stearylammonium bromide, cetyldimethylbenzylammonium bromide, N,N-dimethyldodecylammonium chloride, N-methyltridecylammonium iodide, and the chlorides, bromides, sulfates, methylsulfates, or acetates of ethoxylated fatty amines.

The amount of initiator used in the copolymerization of the nitrogen compound and the non-ionic monomer depends upon both the monomer used and the polymerization temperature, and is generally about 0.1 to 5%, preferably about 0.1 to 2%, by weight, based on the total weight of the monomer. However, if the initiator is the primary or one of the primary constituents of the substance which generates cationic species, a proportional amount of additional initiator should be used.

The amount of emulsifier required to stabilize the copolymer particles can be as much as about 2% of the total weight of the monomer.

The zeta potential of the claimed stable amphoteric aqueous dispersions of synthetic polymers can vary from about +80 mV to −60 mV measured at a pH of from about 2 to 12.

The claimed amphoteric aqueous dispersions of synthetic polymers may be used as binders for coating paper, for finishing non-woven fabrics, or for coating metallic substrates. The substances listed as exemplary constituents of the aqueous dispersions of the claimed invention, and the following examples of the claimed process are illustrative and are not to be construed as limiting the invention delineated in the claims.

EXAMPLE 1

The polymerization process described below is carried out in an autoclave with 5 liter capacity and an anchor-type stirrer with a speed of 180 revolutions per minute.

866 g of dionized water, 7.5 g of cetyldimethylbenzylammonium bromide, 15 g of the chloride of trimethylamino-propylmethacrylamide, and 15 g of dimethylaminoethyl acrylate is charged cold into the autoclave. The temperature of the autoclave is raised to 75° C.

7.5 g of cationic initiator, 2,2'-azobis(2-amidinopropane) hydrochloride, and 50 g of deionized water are introduced simultaneously. 750 g of butyl acetate, 660 g of styrene, and 60 g of dimethylaminoethyl acrylate are then added continuously at a constant rate over 5 hours.

The autoclave is maintained at 75° C. for 4 hours. After a total reaction time of 9 hours, the reaction is stopped by cooling.

A stable crust-free latex with the following characteristics is obtained:
pH: 8.1
Amount of solids: 45.0% by weight
Brookfield viscosity (50 rpm): 250 mPa/s
Mean particle diameter: 0.11$\mu$
Number of grains: 240 ppm The number of grains is determined by sifting the grains through mesh screens 40 and 100$\mu$ wide, and adding the grain content from each sieve.

The amphoteric nature of the produced dispersion is proven by measuring the zeta potential as a function of the pH. A MARK II microelectrophoresis apparatus, manufactured by RANK BROTHERS is used to measure the zeta potential, at 80 volts and at 25° C., of a dispersion with a 0.05% polymer concentration.

The following results are obtained:

| pH  | Zeta potential in mV |
|-----|----------------------|
| 4.5 | +30                  |
| 8.3 | 0 (isoelectric point)|
| 9   | −40                  |

EXAMPLE 2

940 g of deionized water, 9.6 g of cetyldimethylbenzylammonium bromide, 9.6 g of the chloride of trimethylaminopropylmethacrylamide, 24 g of dimethyulaminoethyl acrylate, and 72 g of vinyl acetate, are charged cold into an autoclave.

The temperature of the autoclave is raised to 80° C. 1,100 g of vinyl acetate, 9 g of 2,2'-azobis(2-amidinopropane) hydrochloride, 210 g of deionized water, and 3.6 g of sodium bicarbonate are introduced at a constant rate over 5 hours.

The reaction is maintained for 4 hours.

A stable crust-free latex with the following characteristics is obtained:
pH: 4.2
Amount of solids: 47.5% by weight
Brookfield viscosity (50 rpm): 165 mPa/s
Mean particle diameter: 0.1$\mu$
Number of grains: 165 ppm
The zeta potential measurements are as follows:

| pH | Zeta potential in mV |
|---|---|
| 4.5 | +60 |
| 8.5 | 0 |
| 9 | −30 |

EXAMPLE 3

866 g of deionized water, 7.5 g of cetyldimethylbenzylammonium bromide, 15 g of the chloride of trimethylaminopropylmethacrylamide, and 15 g of dimethylaminoethyl methacrylate is charged cold into an autoclave.

The temperature of the autoclave is raised to 75° C. 7.5 g of 2,2'-azobis(2-amidinopropane) hydrochloride and 50 g of deionized water are introduced. 1,140 g of styrene and 60 g of dimethyulaminoethyl methacrylate are added continuously at a constant rate over 5 hours.

The reaction is thereafter maintained at 75° C. for 4 hours.

A stable crust-free latex with the following characteristics is obtained:
pH: 75
Amount of solids: 46.3% by weight
Brookfield viscosity (50 rpm): 116 mPa/s
Mean particle diameter: 0.1μ
Number of grains: 115 ppm
The zeta potential measurements are as follows:

| pH | Zeta potential in mV |
|---|---|
| 4.5 | +47 |
| 8.3 | 0 |
| 9 | −52 |

EXAMPLE 4

866 g of deionized water, 7.5 g of cetyldimethylbenzylammonium bromide, 15 g of the chloride of trimethylaminopropylmethacrylamide and 15 g of dimethylaminoethyl acrylate are charged cold into an autoclave.

The temperature of the autoclave is raised to 75° C. 7.5 g of 2,2'-azobis(2-amidinopropane) hydrochloride and 50 g of deionized water are introduced simultaneously. 170 g of butyl acrylate, 750 g of ethyl acrylate, and 550 g of methyl methacrylate are added continuously at a constant rate over 5 hours.

The reaction is maintained for 4 hours.

A stable crust-free latex with the following characteristics is obtained:
pH: 8.1
Amount of solids: 42.5% by weight
Brookfield viscosity (50 rpm): 126 mPa/s
Mean particle diameter: 0.12μ
Number of grains: 180 ppm
The zeta potential measurements are as follows:

| pH | Zeta potential in mV |
|---|---|
| 4.5 | +28 |
| 7.9 | 0 |
| 8.5 | −30 |

EXAMPLE 5

866 g of deionized water, 7.5 of cetyldimethylbenzylammonium bromide, and 15 g of the chloride of trimethylaminopropylmethacrylamide are charged cold into an autoclave.

The temperature of the autoclave is raised to 75° C. 7.5 g of 2,2'-azobis(2-amidinopropane) hydrochloride and 50 g of deionized water are introduced simultaneously. 795 g of butyl acrylate, 675 g of styrene, and 15 g of dimethylaminomethyl acrylate are then added continuously at a constant rate over 5 hours.

The reaction was maintained at 75° C. for 4 hours.

A dispersion with the following characteristics is obtained:
pH: 7.8
Amount of solids: 46% by weight
Brookfield viscosity (50 rpm): 90 mPa/s
Mean particle diameter: 0.12μ
Number of grains: 470 ppm
The zeta potential measurements are as follows:

| pH | Zeta potential in mV |
|---|---|
| 4.5 | +42 |
| 8.2 | 0 |
| 8.8 | −31 |

EXAMPLE 6

866 g of deionized water, 7.5 g of cetyldimethylbenzylammonium bromide, 15 g of the chloride of trimethylaminopropylmethacrylamide, and 30 g dimethylaminoethyl methacrylate are charged cold into an autoclave.

The temperature of the autoclave is raised to 75° C. 7.5 g of 2,2'-azobis(2-amidinopropane) hydrochloride and 50 g of deionized water are introduced simultaneously. 750 g of butyl acrylate, 675 g of styrene, and 30 g of dimethyulaminoethyl methacrylate are added continuously at a constant rate over 5 hours.

The reaction is maintained at 75° C. for 4 hours.

A crust-free latex with the following characteristics is obtained:
pH: 7.8
Amount of solids: 41.9% by weight
Brookfield viscosity (50 rpm): 96 mPa/s
Mean particle diameter: 0.12μ
Number of grains: 450 ppm
The zeta potential measurements are as follows:

| pH | Zeta potential in mV |
|---|---|
| 4.5 | +45 |
| 7.2 | 0 |
| 9 | −50 |

EXAMPLE 7

866 g of deionized water, 7.5 g of cetyldimethylbenzylammonium bromide, 15 g of the chloride of trimethylaminopropylmethacrylamide, and 30 g of dimethylaminoethyl methacrylate are charged cold into an autoclave.

The temperature of the autoclave is raised to 75° C. 7.5 g of 2,2'-azobis(2-amidinopropane) hydrochloride and 50 g of deionized water are introduced simultaneously. 750 g of butyl acrylate and 705 g of styrene are then added continuously at a constant rate over 5 hours.

The reaction was maintained at 75° C. for 4 hours. A stable crust-free latex with the following characteristics is obtained:

pH: 7.8
Amount of solids: 44.6% by weight
Brookfield viscosity (50 rpm): 104 mPa/s
Mean particle diameter: 0.12μ
Number of grains: 410 ppm
The zeta potential measurements are as follows:

| pH | Zeta potential in mV |
| --- | --- |
| 4.5 | +41 |
| 7.9 | 0 |
| 8.8 | −29 |

EXAMPLE 8

866 g of deionized water, 7.5 g of cetyldimethylbenzylammonium bromide, 15 g of the chloride of trimethylaminopropyl methacrylate, 15 g of dimethylaminoethyl acrylate, 75 g of styrene and 66 g of butyl acrylate are charged cold into an autoclave.

The temperature of the autoclave is raised to 75° C. 7.5 g of 2,2'-azobis(2-amidinopropane) hydrochloride and 50 g of deionized water are introduced simultaneously. After about 30 minutes, when the exothermic reaction has ended and about 90% of the monomer has been converted to polymer, 594 g of butyl acrylate, 675 g of styrene, and 60 g of dimethylaminoethyl methacrylate, 15 g of 2,2'-azobis(amidinopropane) hydrochloride, and 420 g of deionized water are then added continuously at a constant rate over 5 hours.

The reaction is thereafter maintained for 4 hours.

A dispersion with the following characteristics is obtained:
pH: 7.8
Amount of solids: 45.4% by weight
Brookfield viscosity (50 rpm): 305 mPa/s
Mean particle diameter: 0.1μ
Number of grains: 175 ppm
The zeta potential measurements are as follows:

| pH | Zeta potential in mV |
| --- | --- |
| 4.5 | +49 |
| 8.4 | 0 |
| 9 | −35 |

EXAMPLE 9

866 g of deionized water, 7.5 g of cetyldimethylbenzylammonium bromide, 15 g of dimethyulaminoethyl methacrylate, 75 g of styrene, and 66 g of butyl acrylate are charged cold into an autoclave.

The temperature of the autoclave is raised to 80° C. 15 g of 2,2'-azobis(2-amidinopropane) hydrochloride and 50 g of deionized water are introduced simultaneously. When the exothermic reaction has ended, after about 30 minutes, and the monomers are about 95% converted, 594 g of butyl acrylate, 675 g of styrene, 60 g of dimethylaminoethyl methacrylate, 15 g of 2,2'-azobis(amidinopropane) hydrochloride, and 420 g of deionized water are added continuously at a constant rate over 5 hours.

The reaction is maintained for 4 hours.

A stable crust-free latex with the following characteristics is obtained:
pH: 8.5
Amount of solids: 40.1% by weight
Brookfield viscosity (50 rpm): 78 mPa/s
Mean particle diameter: 0.5μ
Number of grains: 320 ppm
The zeta potential measurements are as follows:

| pH | Zeta potential in mV |
| --- | --- |
| 4.5 | +33 |
| 8.3 | 0 |
| 8.8 | −22 |

EXAMPLE 10

866 g of deionized water, 30 g of the chloride of trimethylaminopropylmethacryamide, 15 g of dimethylaminoethyl methacrylate, 75 g of styrene, and 66 g of butyl acrylate are charged cold into an autoclave.

The temperature of the autoclave is raised to 75° C. 7.5 g of 2,2'-azobis(2-amidinopropane) hydrochloride and 50 g of deionized water are introduced simultaneously. When the exothermic reaction has ended, after about 30 minutes and a 90% conversion level, 594 g of butyl acrylate, 675 g of styrene, 60 g of dimethyulaminoethyl methacrylate, 15 g of 2,2'-azobis(amidinopropane) hydrochloride, and 420 g of deionized water are added continuously at a constant rate over 5 hours.

The reaction is maintained for 4 hours.

A stable crust-free latex with the following characteristics is obtained:
pH: 8.2
Amount of solids: 41.3% by weight
Brookfield viscosity (50 rpm): 108 mPa/s
Mean particle diameter: 0.12μ
Number of grains: 468 ppm
The zeta potential measurements are as follows:

| pH | Zeta potential in mV |
| --- | --- |
| 4.5 | +41 |
| 8.4 | 0 |
| 9 | −29 |

EXAMPLE 11

866 g of deionized water, 7.5 g of cetyldimethylbenzylammonium bromide, 15 g of the chloride of trimethylaminopropylmethacrylamide, and 45 g of dimethylaminoethyl acrylate are charged cold into an autoclave.

The temperature of the autoclave is raised to 75° C. 7.5 g of 2,2'-azobis(2-amidinopropane) hydrochloride and 50 g of deionized water are introduced simultaneously. 750 g of butyl acrylate, 615 g of styrene, and 75 g of dimethyulaminoethyl acrylate are then added continuously at a constant rate over 5 hours.

The reaction is maintained for 4 hours at 75° C.

A crust-free latex with the following characteristics is obtained:
pH: 7.6
Amount of solids: 42% by weight
Brookfield viscosity (50 rpm): 82 mPa/s
Mean particle diameter: 0.1μ
Number of grains: 298 ppm
The zeta potential measurements are as follows:

| pH | Zeta potential in mV |
| --- | --- |
| 4.5 | +42 |
| 8.9 | 0 |

| pH | Zeta potential in mV |
|---|---|
| 9.5 | −38 |

EXAMPLE 12

The procedure of Example 5 is repeated with the 15 g of dimethylaminomethyl acrylate added over 2 hours, instead of over 5 hours, with the 15 g of dimethylaminoethyl acrylate thus added during hour 4 to hour 6 of the reaction and after the reaction has reached about a 92% conversion level.

A dispersion with the following characteristics is obtained:
pH: 8
Amount of solids: 45.2% by weight
Brookfield viscosity (50 rpm): 120 mPa/s
Mean particle diameter: 0.12μ
Number of grains: 412 ppm
The zeta potential measurements were as follows:

| pH | Zeta potential in mV |
|---|---|
| 4.5 | +38 |
| 8 | 0 |
| 8.5 | −20 |

EXAMPLE 13

333 g of the latex produced in Example 1, which is 150 g of solids, i.e. about 10% by weight of the latex, 866 g of deionized water, and 15 g of the chloride of triemethylaminopropylmethacrylamide are charged cold into an autoclave.

The temperature of the autoclave is raised to 75° C. 7.5 g of cationic initiator, 2,2'-azobis(2-amidinopropane) hydrochloride and 50 g of deionized water are introduced simultaneously. 750 g of butyl acrylate, 675 g of styrene, and 60 g of dimethylaminoethyl acrylate are then added continuously at a constant rate over 5 hours.

The reaction is maintained at 75° C. for 4 hours. After a total reaction time of 9 hours, the reaction is stopped by cooling.

A stable crust-free latex with the following characteristics is obtained:
pH: 8.1
Amount of solids: 42.1%
Brookfield viscosity (50 rpm): 112 mPa/s
Mean particle diameter: 0.22μ
Number of grains: 378 ppm
The zeta potential measurements are as follows:

| pH | Zeta potential in mV |
|---|---|
| 4.5 | +49 |
| 7.9 | 0 |
| 8.5 | −36 |

EXAMPLE 4

The process of Example 4 is repeated, but the 15 g of the chloride of trimethylaminopropylmethacrylamide is replaced by 15 g of 1-methyl-2-vinylpyridinium bromide.

A latex with the following characteristics is obtained:
pH: 7.6
Amount of solids: 46.2%
Brookfield viscosity (50 rpm): 188 mPa/s
Mean particle diameter: 0.12μ
Number of grains: 425 ppm
The zeta potential measurements are as follows:

| pH | Zeta potential in mV |
|---|---|
| 4.5 | +39 |
| 8.1 | 0 |
| 9 | −22 |

EXAMPLE 15

The process of Example 6 is repeated, but the 15 g of the chloride of trimethylaminopropylmethacrylamide are replaced by 15 g of the chloride of trimethylaminoethylacrylamide.

A latex with the following characteristics is obtained:
pH: 7.9
Amount of solids: 45.7%
Brookfield viscosity: 165 mPa/s
Means particle diameter: 0.12μ
Number of grains: 365 ppm
The zeta potential measurements are as follows:

| pH | Zeta potential in mV |
|---|---|
| 4.5 | +42 |
| 8.9 | 0 |
| 9 | −28 |

I claim:

1. Stable amphoteric aqueous dispersions of synthetic polymers obtained by reacting:
   (a) at least one unsaturated nitrogen compound having the following formula

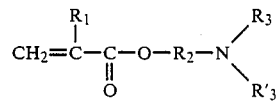

wherein $R_1$ is a hydrogen atom or a methyl group, $R_2$ is a methylene or ethylene group, $R_3$ is a hydrogen atom or a linear alkyl group with 1 to 4 carbon atoms, and $R'_3$ is either a hydrogen atom or a linear alkyl group with 1 to 4 carbon atoms, or, if $R_3$ represents a hydrogen atom, a branched alkyl group with 3 or 4 carbon atoms, wherein the total number of carbon atoms in groups $R_2$, $R_3$, and $R'_3$, taken together, is less than or equal to 8, said nitrogen compound being capable of generating anionic charges by total or partial hydrolysis in a basic medium, with (b) a cationic aqueous emulsion mixture free or at least substantially free from anionic species and containing:
   (i) at least one non-ionic monomer selected from the group consisting of vinylaromatic compounds, vinyl esters, ethylenic nitriles, ethylenic carboxylic esters, dialkyl esters of ethylenic dicarboxylic acids, ethylenic amides, and the N-substituted derivatives of ethylenic amides,
   (ii) an unsaturated salt of a polycoordinated onium of a group 5a or 6a element capable of copolymerizing with said monomer,
   (iii) a cationic or non-ionic polymerization initiator, (iv) and a cationic or non-ionic emulsifier, the amount of said unsaturated nitrogen compound being such that the ratio of the number of anionic charges generated by said unsaturated nitrogen compound in a basic medium to the number of cationic charges of the cationic aqueous emulsion mixture in a basic medium is more than 1.

2. The aqueous dispersions of claim 1 wherein said aqueous emulsion mixture includes a mixture of non-ionic monomers and polymerized non-ionic monomers.

3. The aqueous dispersions of claim 1, wherein said unsaturated nitrogen compound is selected from the group consisting of dimethylaminomethyl acrylate or methacrylate, dimethylaminoethyl acrylate or methacrylate, tert-butylaminomethyl acrylate or methacrylate, and tert-butylaminoethyl acrylate or methacrylate.

4. The aqueous dispersions of claim 1, wherein said unsaturated salt of a polycoordinated onium is an unsaturated quaternary ammonium salt of the formula:

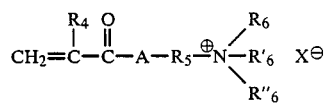

where $X^-$ is $Cl^-$, $Br^-$, $I^-$, $SO_4H^-$, $SO_4^{--}$, $CH_3SO_4^-$, $C_2H_5SO_4^-$ or $CH_3COO^-$, $R_4$ is a hydrogen atom or a methyl group, A is an oxygen atom or an —NH— group, $R_5$ is a linear or branched alkylene group with 1 to 18 carbon atoms, and $R_6$, $R''_6$, which may be identical or different, are either an alkyl group with 1 to 4 carbon atoms, optionally substituted by a hydroxyl radical, or a phenyl group, optionally substituted by an alkyl radical with 1 to 9 carbon atoms, wherein the total number of carbon atoms in groups $R_5$, $R_6$, $R'_6$, and $R''_6$, taken together, is greater than 4 if A is oxygen.

5. The aqueous dispersions of claim 4, wherein said ammonium salt is selected from the group consisting of the chloride of trimethylaminoethyl-acrylamide or -methacrylamide, the bromide of trimethylaminopropyl-acrylamide or -methacrylamide, the methylsulfate of trimethylamino-butyl-acrylamide or -methacrylamide, and the chloride of trimethylaminopropyl methacrylate.

6. The aqueous dispersions of claim 1, wherein said unsaturated salt of a polycoordinated onium is selected from the group consisting of unsaturated pyridinium, quinolinium, imidazolium, and benzimidazolium salts.

7. The aqueous dispersions of claim 1, wherein the amount of said unsaturated compound corresponds to about 1 to 20% by weight of said non-ionic monomer.

8. The aqueous dispersions of claim 1, wherein the amount of said unsaturated nitrogen compound corresponds to about 1 to 10% by weight of said non-ionic monomer.

9. The aqueous dispersions of claim 1, wherein the molar ratio of (i) the number of moles of said unsaturated salt of a polycoordinated onium initially in the cationic aqueous emulsion mixture plus (ii) the number of moles of said unsaturated nitrogen compound provided to (iii) the number of moles of said non-ionic monomer initially in said cationic aqueous emulsion mixture is between about 0.1 and 15.

10. A process comprising using said aqueous dispersions of claim 1 as binders.

11. A process for making stable amphoteric aqueous dispersions of synthetic polymers comprising the steps of:

(a) providing at least one unsaturated nitrogen compound having the following formula

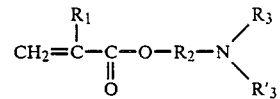

wherein $R_1$ is a hydrogen atom or a methyl group, $R_2$ is a methylene or ethylene group, $R_3$ is a hydrogen atom or linear alkyl group with 1 to 4 carbon atoms, and $R'_3$ is either a hydrogen atom or a linear alkyl group with 1 to 4 carbon atoms, or, if $R_3$ represents a hydrogen atom, a branched alkyl group with 3 or 4 carbon atoms, wherein the total number of carbon atoms in groups $R_2$, $R_3$, and $R'_3$, taken together is less than or equal to 8, said unsaturated nitrogen compound being capable of generating anionic charges by total or partial hydrolysis in a basic medium; and (b) reacting with said unsaturated nitrogen compound a cationic aqueous emulsion mixture free or at least substantially free from anionic species containing
(i) at least one non-ionic monomer selected from the group consisting of vinylaromatic compounds, vinyl esters, ethylenic nitriles, ethylenic carboxylic esters, dialkyl esters of ethylenic dicarboxylic acids, ethylenic amides and the N-substituted derivatives of ethylenic amides, and
(ii) an unsaturated salt of a polycoordinated onium of a group 5a or 6a element capable of copolymerizing with said monomer,
(iii) a cationic or non-ionic polymerization initiator,
(iv) and a cationic or non-ionic emulsifier, the amount of said unsaturated nitrogen compound being such that the ratio of the number of anionic charges generated by said unsaturated nitrogen compound in a basic medium to the number of cationic charges of the cationic aqueous emulsion mixture in a basic medium is more than 1.

12. The process according to claim 11 wherein the molar ratio of (i) of moles of said unsaturated salt of a polycoordinated onium initially in the cationic aqueous emulsion mixture plus (ii) the number of moles of said unsaturated nitrogen compound provided to (iii) the number of moles of said non-ionic monomer initially in said cationic aqueous emulsion mixture is between about 0.1 to 15.

13. The process according to claim 11 wherein said unsaturated nitrogen compound is added to said aqueous emulsion mixture during any stage of the polymerization of said non-ionic monomer.

14. The process according to claim 11 wherein said substance is added to said aqueous emulsion mixture before or simultaneously with said unsaturated nitrogen compound.

15. The processs according to claim 11 wherein a cationic seed, comprising a polymer or copolymer prepared by aqueous emulsion polymerization, in a cationic medium, of at least one non-ionic monomer in the presence of said substance is present in the aqueous emulsion mixture at the start of the polymerization of said non-ionic monomer.

16. The process according to claim 11 wherein said unsaturated nitrogen compound is selected from the group consisting of dimethylaminomethyl acrylate or methacrylate, dimethylaminoethyl acrylate or methacrylate, tert-butylaminoethyl acrylate or methacrylate, and tert-butylaminoethyl acrylate or methacrylate.

17. The process according to claim 11 wherein said substance is an unsaturated quaternary ammonium salt of the formula:

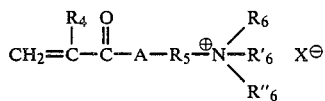

where $X^-$ is $Cl^-$, $Br^-$, $I^-$, $SO_4H^-$, $SO_4^{--}$, $CH_3SO_4^-$, $C_2H_5SO_4^-$ or $CH_3COO^-$, $R_4$ is a hydrogen atom or a methyl group, A is an oxygen atom or an —NH— group, $R_5$ is a linear or branched alkylene group with 1 to 18 carbon atoms, and $R_6$, $R'_6$ and $R''_6$, which may be identical, are either an alkyl group with 1 to 4 carbon atoms, optionally substituted by a hydroxyl radical, or a phenyl group, optionally substituted by an alkyl radical with 1 to 9 carbon atoms, wherein the total number of carbon atoms in groups $R_5$, $R_6$, $R'_6$ and $R''_6$, taken together, is greater than 4 if A is oxygen.

18. The process according to claim 17, wherein said ammonium salt is selected from the group consisting of the chloride of trimethylaminoethyl-acrylate or -methacrylamide, the bromide of trimethylaminopropyl-acrylamide or -methacrylate, the methylsulfate of trimethylamino-butyl-acrylamide or -methacrylamide, and the chloride of trimethylaminopropyl methacrylate.

19. The process according to claim 11, wherein said substance is selected from the group consisting of unsaturated pyridinium, quinolinium, imidazolium, and benzimidazolium salts.

20. The process according to claim 11 wherein the amount of said unsaturated nitrogen compound corresponds to about 1 to 20% by weight of said non-ionic monomer.

21. The process according to claim 11, wherein the reaction of said unsaturated nitrogen compound and said aqueous emulsion mixture is performed at a temperature between about 60° C. and 90° C. and at a pH from about 5 to 9.

* * * * *

UNITED STATES PATENT AND TRADEMARK OFFICE
CERTIFICATE OF CORRECTION

PATENT NO. : 4,857,585

DATED : August 15, 1989

INVENTOR(S) : Frederic Leising

It is certified that error appears in the above-identified patent and that said Letters Patent is hereby corrected as shown below:

Claim 4, column 13, line 31 "$R_6$," should be followed by --R'6 and --.

Claim 12, column 14, line 47 "(i)" should be followed by --the number--.

Claim 15, column 14, line 62 change "processs" to --process--.

Claim 18, column 16, line 5, change "acrylate" to --acrylamide--.

Signed and Sealed this

Twenty-fifth Day of September, 1990

Attest:

HARRY F. MANBECK, JR.

*Attesting Officer*     *Commissioner of Patents and Trademarks*